United States Patent
Okubo

(10) Patent No.: US 6,972,691 B2
(45) Date of Patent: Dec. 6, 2005

(54) TIRE CONDITION MONITORING APPARATUS

(75) Inventor: Youichi Okubo, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 463 days.

(21) Appl. No.: 10/364,192

(22) Filed: Feb. 11, 2003

(65) Prior Publication Data

US 2003/0156025 A1    Aug. 21, 2003

(30) Foreign Application Priority Data

Feb. 18, 2002    (JP) .............................. 2002-040209

(51) Int. Cl.[7] .............................................. B60Q 1/40
(52) U.S. Cl. ................ 340/870.07; 340/447; 340/445; 73/146.5
(58) Field of Search ............................... 340/447, 445, 340/870.07, 870.12; 73/146.5

(56) References Cited

U.S. PATENT DOCUMENTS

| 5,602,524 A | 2/1997 | Mock et al. ................ 340/477 |
| 5,612,671 A * | 3/1997 | Mendez et al. ............. 340/447 |
| 6,018,993 A * | 2/2000 | Normann et al. .......... 73/146.5 |
| 6,414,592 B1 * | 7/2002 | Dixit et al. ................. 340/447 |

FOREIGN PATENT DOCUMENTS

| EP | 1026015 | 1/2000 |
| JP | 10329104 | 11/1998 |
| JP | 2000-153703 | 6/2000 |

* cited by examiner

Primary Examiner—Albert K. Wong
(74) Attorney, Agent, or Firm—Sawyer Law Group LLP

(57) ABSTRACT

When registering the ID code of a transmitter in a receiver, a commander is brought close to the transmitter and then a manipulation switch of the commander is pressed. Then, the commander transmits an instruction signal to the transmitter. In response to the instruction signal, the transmitter transmits a response signal including eight consecutive data frames. When receiving the signal from the transmitter, the receiver counts the number of the data fames in the received signal. f the number of the data frames is eight, the receiver determines that the received signal is a response signal generated based on manipulation of the commander and registered the ID code in the response signal. That is, the receiver determines whether to register the ID code in the received signal based on the number of the data frames included in the received signal. As a result, the ID code of the transmitter is easily registered in the receiver.

11 Claims, 2 Drawing Sheets

Fig.3
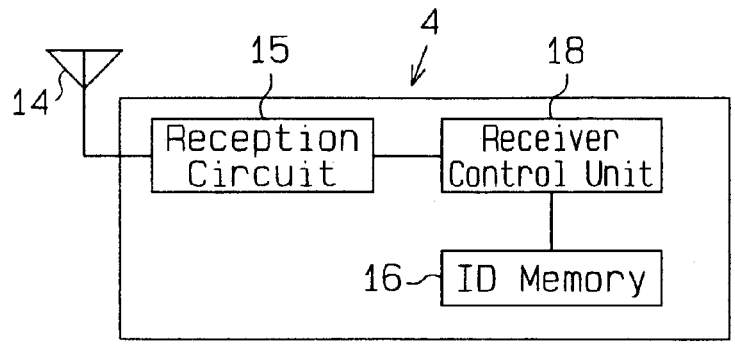
Fig.4
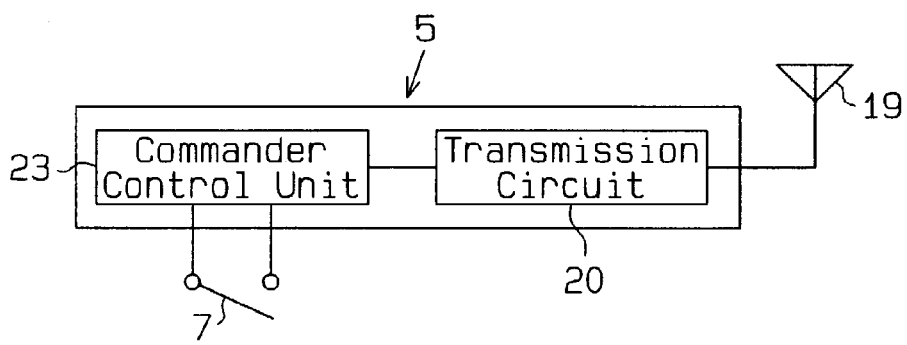
Fig.5(a)
Periodical Transmission Mode
(Abnormality Transmission Mode)
| Id Code | Pressure Data | Status Code | ⋯ | x5 |
|---|---|---|---|---|
Fig.5(b)
Response Transmission Mode
| Id Code | Pressure Data | Status Code | ⋯ | x8 |
|---|---|---|---|---|

TIRE CONDITION MONITORING APPARATUS

BACKGROUND OF THE INVENTION

The present invention relates to a tire condition monitoring apparatus that monitors the condition of the tires of a vehicle and informs a driver in the vehicle passenger compartment of the tire condition. More particularly, the present invention pertains to a structure for registering ID data of transmitters in a receiver.

Conventionally, a wireless type tire condition monitoring apparatus has been used for permitting a driver in the passenger compartment to monitor the condition of the tires. The apparatus includes transmitters, each of which is associated with a different one of the tires and is attached to a wheel of the tire, and a receiver mounted in the body frame of the vehicle. Each transmitter detects the condition of the associated tire, such as the tire pressure and the interior temperature of the tire, and wirelessly transmits a signal including data that indicates the detection results to the receiver. On receiving the signal, the receiver displays the condition of the tire on a display, which is located, for example, in the passenger compartment.

A specific identification data (ID code) is given to each of the transmitters. Each transmitter transmits signals that include data of the tire condition and the given ID code. On the other hand, the ID codes of all the transmitters associated with the vehicle on which the receiver is mounted are registered in the receiver. When the ID code included in the received signal matches with one of the registered ID codes, the receiver continues processing the received signal. However, if the ID code included in the received signal differs from any of the registered ID codes, the receiver does not process the received signal. Therefore, the receiver is prevented from processing signals from a transmitter that is not associated with the vehicle on which the receiver is mounted.

Japanese Laid-Open Patent Publication No. 2000-153703 discloses a technology for registering an ID code of a transmitter in the receiver. According to the above publication, when registering the ID code of the transmitter to the receiver, the operation mode of the receiver is switched from a monitoring mode for monitoring the tire condition to a registration mode for registering the ID code. In this state, a control tool is brought close to one of the transmitters and an instruction signal is sent to the transmitter from the control tool. Then, in response to the instruction signal, the transmitter sends a signal including data of the tire condition and the ID code. When the receiver is in the registration mode and receives the signal from the transmitter, the receiver registers (stores) the ID code included in the signal. Therefore, by transmitting signals from all the transmitters on the vehicle using the control tool, the ID codes of all the transmitters are registered in the receiver. After registering the ID codes, the operation mode of the receiver is switched back to the monitoring mode.

However, according to the structure of the above publication, when registering the ID code of the transmitter to the receiver, the operation mode of the receiver needs to be switched manually, and the control tool needs to be manipulated to permit the transmitter to transmit a signal. Thus, registering the ID codes to the receiver is troublesome.

SUMMARY OF THE INVENTION

Accordingly, it is an objective of the present invention to provide a tire condition monitoring apparatus that easily registers identification data of transmitters in a receiver.

To achieve the foregoing and other objectives and in accordance with the purpose of the present invention, an apparatus for monitoring the condition of a tire of a vehicle is provided. The apparatus includes a commander, a transmitter, and a receiver. The commander has an operation switch and transmits an instruction signal when the operation switch is turned on. The transmitter is provided in the tire. A unique identification data is assigned to the transmitter in advance. The transmitter includes a tire condition sensor for detecting the condition of the tire, a receiving portion for receiving the instruction signal, and a transmitting portion for transmitting signals. The receiver is located in the body of the vehicle. The receiver includes a receiving portion for receiving signals transmitted from the transmitter and a rewritable ID memory for storing the identification data of the transmitter.

The transmitter has a first transmission mode, in which the transmitter transmits a signal regardless whether the commander transmits the instruction signal, and a second transmission mode, in which the transmitter transmits a signal in response to the instruction signal from the commander. The signal transmitted according to the first transmission mode is a first signal. The first signal includes at least data representing the tire condition detected by the tire condition sensor and the identification data. The signal transmitted according to the second transmission mode is a second signal. The second signal includes at least the identification data. When receiving the first signal, the receiver continues processing the received first signal if the identification data in the received first signal matches with the identification data in the ID memory. When receiving the second signal, the receiver stores the identification data in the received second signal in the ID memory.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a block diagram showing the receiver in the monitoring apparatus of FIG. 1;

FIG. 4 is a block diagram showing the commander of FIG. 1;

FIG. 5($a$) is a diagram showing a signal transmitted according to a periodic transmission mode and an abnormality transmission mode; and FIG. 5($b$) is a diagram showing a signal transmitted according to a response transmission mode.

DETAILED DESCRIPTION OF THE PREFERRED EMBODIMENTS

Figure 1:
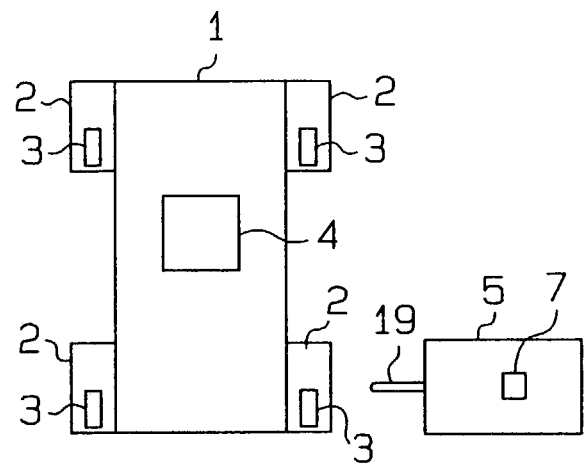
FIG. 1 is a diagrammatic view showing a tire condition monitoring apparatus according to one embodiment of the present invention.

A first embodiment of the present invention will now be described with reference to FIGS. 1 to 5(b). FIG. 1 shows a tire condition monitoring apparatus. The apparatus includes four transmitters 3, a receiver 4, and a commander 5. Each transmitter 3 is installed in an associated wheel 2 of a vehicle 1. The receiver 4 is located in the body of the vehicle 1. The commander 5 transmits an instruction signal to each transmitter 3. Each transmitter 3 is fixed to the wheel 2 to which the associated tire is attached such that the transmitter 3 is located in the interior of the tire. Each transmitter 3 detects the condition of the associated tire, such as the tire pressure, and wirelessly transmits a signal including data that indicates the detected tire pressure. The receiver 4 receives the signal wirelessly transmitted by each transmitter 3 and processes the received signal.

Figure 2:
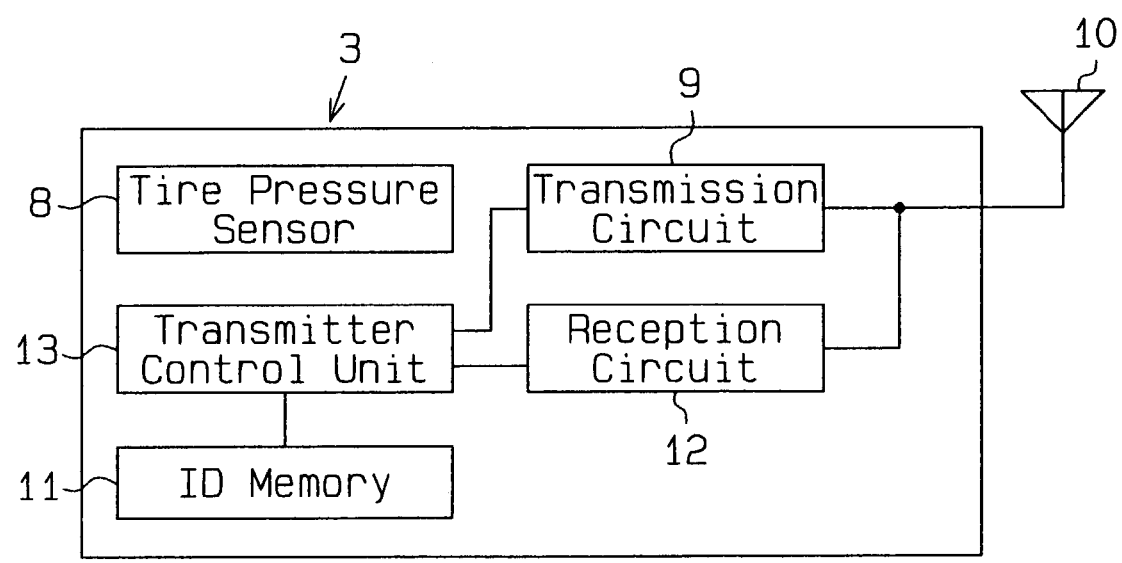
FIG. 2 is a block diagram showing a transmitter in the monitoring apparatus of FIG. 1.

With reference to FIG. 2, each transmitter 3 has a transmitter control unit 13, which is, for example, a microcomputer. A controller, which is the transmitter control unit 13 in the first embodiment, includes, for example, a central processing unit (CPU), a random access memory (RAM), and a read only memory (ROM). The transmitter control unit 13 controls the operation of the entire transmitters 3. Each transmitter 3 further includes a tire condition sensor, which is a tire pressure sensor 8 in the first embodiment, a transmitting portion, which is a transmission circuit 9 in the first embodiment, an antenna 10, an ID memory 11 that stores a specific ID code of the transmitter 3, and a receiving portion, which is a reception circuit 12 in the first embodiment. The ID codes are identification information specific to each of the transmitters 3 and are used to permit the receiver 4 to identify each of the four transmitters 3 installed in, or associated with, the vehicle 1.

The tire pressure sensor 8 measures the pressure in the interior of the associated tire and provides the transmitter control unit 13 with pressure data, which is obtained from the measurement. The transmitter control unit 13 sends data including the pressure data and the ID code stored in the ID memory 11 to the transmission circuit 9. The transmission circuit 9 encodes and modulates the data sent from the transmitter control unit 13. The transmission circuit 9 then wirelessly sends a signal including the data through the antenna 10.

The transmitter control unit 13 of each transmitter 3 controls the pressure sensor 8 to perform measurement at predetermined time intervals (for example, every 15 seconds). Also, the transmitter control unit 13 controls the transmission circuit 9 to perform periodic transmission every time the pressure sensor 8 completes a predetermined number of (for example, 40 cycles of) measurements (a periodic transmission mode of the transmitters 3). However, when acknowledging an abnormality of the pressure of the associated tire (such as rapid change or decrease of pressure), the transmitter control unit 13 causes the transmission circuit 9 to transmit data immediately regardless of the periodic transmission (an abnormality transmission mode of the transmitters 3). In this embodiment, the structure of a signal transmitted from each transmitter 3 in the abnormality transmission mode is the same as the structure of a signal transmitted from each transmitter 3 in the periodic transmission mode.

That is, as shown in FIG. 5(a), in a single transmission according to the periodic transmission mode, an identical data frame is consecutively transmitted for a plurality of times (in this embodiment, five times). Each data frame includes an ID code, pressure data, and a status code indicating the type of the transmission signal. As in a single transmission according to the periodic transmission mode, an identical data frame is transmitted five times in a single transmission according to the abnormality transmission mode. In this manner, a signal containing five identical data frames is transmitted in the periodic transmission mode and the abnormality transmission mode.

Each transmitter 3 has a battery (not shown), which powers the transmitter 3. Although not shown in the drawings, each transmitter 3 may further include a temperature sensor as the tire condition sensor. The data indicating the detected temperature in the interior of the tire is included in the signal sent from the transmitter 3.

The reception circuit 12 receives an external signal, or the instruction signal from the commander 5, through the antenna 10. When receiving the instruction signal from the commander 5 via the reception circuit 12, the transmitter control unit 13 commands the transmission circuit 9 to wirelessly transmit a response signal via the antenna 10 (a response transmission mode of the transmitter 3). As shown in FIG. 5(b), the response signal includes consecutive data frames (in this embodiment, five times). That is, in a single transmission according to the response transmission mode, an identical data frame is consecutively transmitted eight times. The number of the data frames transmitted in a single transmission according to the response transmission mode is different from the number of the data frames transmitted in a single transmission according to either of the periodic transmission and the abnormality transmission mode. However, the structure of each data frame in the response signal is the same as the structure of each data frame in a signal according to either one of the periodic transmission mode and the abnormality transmission mode. That is, each data frame in the response signal, which is transmitted according to the response transmission mode, includes an ID code, pressure data, and a status code.

The periodic transmission mode and the abnormality transmission mode correspond to a first transmission mode in which a signal (first signal) is transmitted regardless whether the commander 5 sends an instruction signal. The response transmission mode corresponds to a second transmission mode in which a signal (second signal) is transmitted in response to an instruction signal from the commander 5.

Each transmitter 3 includes a valve stem (not shown) for introducing air into the interior of the tire. Each valve stem projects outside the associated tire through the corresponding wheel 2 and can also be used as the antenna 10.

The receiver 4, which is shown in FIG. 3, is powered by a battery (not shown) installed in the vehicle 1. The receiver 4 includes a receiver control unit 18, which is, for example, a microcomputer. A controller, which is the receiver control unit 18 in the first embodiment, includes, for example, a CPU, a RAM, and a ROM. The receiver control unit 18 controls the operation of the entire receiver 4. The receiver 4 further includes at least one reception antenna 14, a receiving portion, which is a reception circuit 15 in the first embodiment, and a rewritable ID memory 16 for storing the ID code of the four transmitters 3 installed in the vehicle 1.

The reception circuit 15 receives data transmitted by the transmitters 3 through the reception antenna 14. The reception circuit 15 demodulates and decodes the received signal to obtain data, which is then transmitted to the receiver control unit 18. The receiver control unit 18 obtains the pressure in the interior of the tire associated with the source transmitter 3 based on the data from the reception circuit 15.

The receiver control unit 18 displays the information concerning the tire pressure on a display (not shown), which is connected to the receiver 4. The display is located in the passenger compartment so that the occupants of the vehicle 1 can see the information shown on the display. Abnormality of the tire pressure may be informed by the display or an alarm separately provided from the display.

As shown in FIG. 4, the portable commander (control tool) 5 includes a commander control unit 23, which is, for example, a microcomputer. A controller, which is the commander control unit 23 in the first embodiment, includes, for example, a CPU, a RAM, and a ROM. The commander control unit 23 controls the operation of the entire commander 5. The commander 5 further includes an antenna 19, a transmitting portion, which is a transmission circuit 20 in the first embodiment, and an operation switch 7, which is manually operated to transmit instruction signals to the transmitters 3. The operation switch 7 is, for example, a push-button.

The ID code of each transmitter 3 is registered in the receiver 4 as follows. First, the antenna 19 of the commander 5 is brought close to the antenna 10 of one of the transmitters 3. The operation switch 7 of the commander 5 is then depressed. The commander control unit 23 then transmits an instruction signal to the corresponding transmitter 3 via the transmission circuit 20 and the antenna 19. Since the radio field intensity of the instruction signal transmitted by the commander 5 is relatively feeble, the signal cannot be received by the transmitters 3 other than the one located close to the transmission antenna 19 of the commander 5.

When receiving the instruction signal through the antenna 10 and the reception circuit 12, the transmitter control unit 13 transmits a response signal including the eight consecutive data frames as shown in FIG. 5(*b*) in response to the instruction signal.

When receiving a signal from the transmitters 3 through the reception antenna 14 and the reception circuit 15, the receiver control unit 18 counts the number of data frames included in the received signal. If the number of the data frames in the received signal is five or less, the receiver control unit 18 compares the ID code included in the received signal with the ID codes registered in the ID memory 16. Only when the ID code in the received signal matches with one of the ID codes in the ID memory 16, the receiver control unit 18 continues processing the received signal. That is, the receiver control unit 18 retrieves information such as the pressure data from the received signal, and, as necessary, displays information regarding the tire condition on the display located in the passenger compartment. Also, based on the status code included in the received signal, the receiver control unit 18 recognizes the transmission mode according to which the transmitter 3 has transmitted the signal (that is, which one of the periodic transmission mode and the abnormality transmission mode the signal is based on).

On the other hand, if the number of the data frames in the received signal is eight, the receiver control unit 18 determines that the received signal is a response signal generated based on manipulation of the commander 5 and registers the ID code in the response signal in the ID memory 16. That is, the receiver control unit 18 determines whether to register the ID code of the received signal based on the number of the data frames included in the received signal.

If the four transmitters 3 of the vehicle 1 are caused to consecutively transmit response signals in response to instruction signals from the commander 5, the ID codes of all the four transmitters 3 will be registered in the receiver 4.

This embodiment provides the following advantages.

When registering the ID codes of any of the transmitters 3, all that has to be done is to use the commander 5 to cause the transmitter 3 to transmit a response signal. Unlike the prior art, it is not necessary to separately perform an operation for switching the receiver 4 to the ID code registration mode, and an operation for causing the transmitter 3 to transmit a response signal. Therefore, registration of the ID codes of the transmitters 3 in the receiver 4 is simplified.

The above embodiment is performed simply by differentiating the number of the data frame transmitted in a single transmission between the response transmission mode for permitting the receiver 4 to register ID codes and the other transmission modes. The structure of each data frame is the same for all the operation modes. Thus, the configuration and the control for transmission are simple, which reduces the costs.

The number of data frame transmitted in a single transmission is greater in the response transmission mode than in the other transmission modes. Therefore, the receiver 4 does not misidentify a transmission signal according to the periodic transmission mode or the abnormality transmission mode as a transmission signal according to the response transmission mode. Therefore, an ID code that need not be registered is not erroneously registered in the receiver 4.

It should be apparent to those skilled in the art that the present invention may be embodied in many other specific forms without departing from the spirit or scope of the invention. Particularly, it should be understood that the invention may be embodied in the following forms.

As long as different between the response transmission mode and the other transmission mode, the number of data frames transmitted in a single transmission is not limited to the ones listed above but may be any number.

In each of the response transmission mode and the other transmission modes, the same number that is one or greater may be used as the number of data frames transmitted in a single transmission of all the transmission modes, and the structure of the data fames may be different (for example, the number of bits consisting the data frames). That is, as long as the receiver 4 can discriminate the response transmission mode and the other transmission modes, any form of transmission signals may be used.

As long as the response signal of each transmitter 3 in response to the instruction signal from the commander 5 includes at least the ID code, the response signal need not include, for example, the pressure data.

Therefore, the present examples and embodiments are to be considered as illustrative and not restrictive and the invention is not to be limited to the details given herein, but may be modified within the scope and equivalence of the appended claims.

What is claimed is:

1. An apparatus for monitoring the condition of a tire of a vehicle, the apparatus comprising:
   a commander having an operation switch, wherein the commander transmits an instruction signal when the operation switch is turned on;
   a transmitter provided in the tire, wherein a unique identification data is assigned to the transmitter in advance, and wherein the transmitter includes a tire condition sensor for detecting the condition of the tire, a receiving portion for receiving the instruction signal, and a transmitting portion for transmitting signals; and a receiver located in the body of the vehicle, wherein the receiver includes a receiving portion for receiving signals transmitted from the transmitter and a rewritable ID memory for storing the identification data of the transmitter, wherein the transmitter has a first transmission mode, in which the transmitter transmits a signal regardless whether the commander transmits the instruction signal, and a second transmission mode, in which the transmitter transmits a signal in response to the instruction signal from the commander, wherein the signal transmitted according to the first transmission mode is a first signal, the first signal including at least data representing the tire condition detected by the tire condition sensor and the identification data, and wherein the signal transmitted according to the second transmission mode is a second signal, the second signal including at least the identification data, and wherein, when receiving the first signal, the receiver continues processing the received first signal if the identification data in the received first signal matches with the identification data in the ID memory, and wherein, when receiving the second signal, the receiver stores the identification data in the received second signal in the ID memory.

2. The apparatus according to claim 1, wherein the first signal includes at least one data frame, and the second signal includes data frames number of which is different from the number of the data frames included in the first signal, and wherein the receiver determines whether the received signal is the first signal or the second signal based on the number of the data frames included in the received signal.

3. The apparatus according to claim 2, wherein the number of the data frames included in the second signal is greater than the number of the data frames included in the first signal.

4. The apparatus according to claim 2, wherein each data frame included in the second signal has the same structure as that of each data frame included in the first signal.

5. The apparatus according to claim 1, wherein the first signal includes at least one data frame, and the second signal includes at least one data frame the structure of which is different from the structure of the data frame included in the first signal, and wherein the receiver determines whether the received signal is the first signal or the second signal based on the structure of the data frame included in the received signal.

6. The apparatus according to claim 5, wherein the number of the data frames included in the second signal is equal to the number of the data frames included in the first signal.

7. The apparatus according to claim 1, wherein the commander is portable.

8. An apparatus for monitoring the conditions of a plurality of tires of a vehicle, the apparatus comprising:

a commander having an operation switch, wherein the commander transmits an instruction signal when the operation switch is turned on;

a plurality of transmitters each provided in one of the tires, wherein a unique identification data is assigned to each transmitter in advance, and wherein each transmitter includes a tire condition sensor for detecting the condition of the corresponding tire, a receiving portion for receiving the instruction signal, and a transmitting portion for transmitting a signal that includes at least data representing the tire condition detected by the tire condition sensor and the identification data; and a receiver located in the body of the vehicle, wherein the receiver includes a receiving portion for receiving signals transmitted from the transmitters and a rewritable ID memory for storing the identification data of the transmitters, wherein each transmitter has a first transmission mode, in which the transmitter transmits a signal regardless whether the commander transmits the instruction signal, and a second transmission mode, in which the transmitter transmits a signal in response to the instruction signal from the commander, wherein the signal transmitted according to the first transmission mode is a first signal, the first signal including a plurality of data frames, and wherein the signal transmitted according to the second transmission mode is a second signal, the second signal including a plurality of data fames the number of which is different from the number of the data frames included in the first signal, and wherein the receiver determines whether the received signal is the first signal or the second signal based on the number of the data frames included in the received signal, wherein, when the received signal is the first signal, the receiver continues processing the first signal if the identification data in the first signal matches with one of the identification data in the ID memory, and wherein, when received signal is the second signal, the receiver stores the identification data in the second signal in the ID memory.

9. The apparatus according to claim 8, wherein the number of the data frames included in the second signal is greater than the number of the data frames included in the first signal.

10. The apparatus according to claim 8, wherein each data frame included in the second signal has the same structure as that of each data frame included in the first signal.

11. The apparatus according to claim 8, wherein the commander is portable.

* * * * *